(12) United States Patent
Whitten et al.

(10) Patent No.: US 9,959,944 B2
(45) Date of Patent: May 1, 2018

(54) SELF-SUPPORTING RADIAL NEUTRON REFLECTOR

(75) Inventors: Andrew C. Whitten, Lynchburg, VA (US); Michael J. Edwards, Forest, VA (US); Matthew W. Ales, Forest, VA (US)

(73) Assignee: BWXT mPower, Inc., Charlotte, NC (US)

( * ) Notice: Subject to any disclaimer, the term of this patent is extended or adjusted under 35 U.S.C. 154(b) by 409 days.

(21) Appl. No.: 13/607,940

(22) Filed: Sep. 10, 2012

(65) Prior Publication Data

US 2013/0272470 A1 Oct. 17, 2013

Related U.S. Application Data

(60) Provisional application No. 61/623,332, filed on Apr. 12, 2012.

(51) Int. Cl.
*G21C 11/06* (2006.01)
*G21F 3/04* (2006.01)
*G21C 5/02* (2006.01)

(52) U.S. Cl.
CPC .............. *G21C 11/06* (2013.01); *G21F 3/04* (2013.01); *G21C 5/02* (2013.01); *Y02E 30/40* (2013.01)

(58) Field of Classification Search
CPC .................................. G21C 11/06; G21F 3/04
USPC .................................. 376/458, 459; 52/592.6
See application file for complete search history.

(56) References Cited

U.S. PATENT DOCUMENTS

| 221,127 | A | * | 10/1879 | Walker | F23J 13/025 |
| | | | | | 138/155 |
| 1,644,247 | A | * | 10/1927 | Gates | E04C 2/28 |
| | | | | | 52/592.6 |
| 2,720,105 | A | * | 10/1955 | Billups | 52/592.2 |
| 3,124,514 | A | * | 3/1964 | Koutz et al. | 376/388 |

(Continued)

FOREIGN PATENT DOCUMENTS

| CN | 85108227 | 8/1986 |
| CN | 85105688 | 1/1987 |

(Continued)

OTHER PUBLICATIONS

International Search Report and Written Opinion for PCT/US2013/023584 dated Oct. 18, 2013.

(Continued)

*Primary Examiner* — Sharon M Davis
(74) *Attorney, Agent, or Firm* — Nelson Mullins Riley & Scarborough LLP

(57) ABSTRACT

A nuclear reactor core comprising fissile material is surrounded by a core former. The core former comprises one or more single-piece annular rings wherein each single-piece annular ring comprises neutron-reflecting material. In some embodiments the core former comprises a stack of two or more such single-piece annular rings. In some embodiments the stack of single-piece annular rings is self-supporting. In some embodiments the stack of single-piece annular rings does not include welds or fasteners securing adjacent single-piece annular rings together. A core basket may contain the nuclear reactor core and the core former, and in some embodiments an annular gap is defined between the core former and the core basket. In some embodiments the core former does not include welds and does not include fasteners.

16 Claims, 4 Drawing Sheets

(56) References Cited

U.S. PATENT DOCUMENTS

| | | | |
|---|---|---|---|
| 3,868,302 A | 2/1975 | Singleton | |
| 3,995,165 A * | 11/1976 | Buth | G21F 3/04 |
| | | | 250/517.1 |
| 4,026,086 A * | 5/1977 | Langley | E04B 2/06 |
| | | | 335/306 |
| 4,142,936 A | 3/1979 | Steinkamp et al. | |
| 4,146,430 A | 3/1979 | Berringer | |
| 4,300,984 A | 11/1981 | Katscher et al. | |
| 4,565,043 A * | 1/1986 | Mazzarese | E04B 2/26 |
| | | | 52/592.6 |
| 4,650,643 A | 3/1987 | Anthony | |
| 4,731,220 A | 3/1988 | Kim, Jr. | |
| 4,743,423 A | 5/1988 | Turner et al. | |
| 4,751,043 A * | 6/1988 | Freeman et al. | 376/400 |
| 4,759,896 A | 7/1988 | Boyd | |
| 4,849,162 A | 7/1989 | Garner et al. | |
| 4,885,127 A | 12/1989 | Yokoyama | |
| 4,895,698 A | 1/1990 | DeMario | |
| 4,923,669 A | 5/1990 | DeMario | |
| 4,941,159 A | 7/1990 | Schwirian et al. | |
| 4,957,697 A | 9/1990 | Wada | |
| 4,966,745 A | 10/1990 | Widener et al. | |
| 4,990,304 A | 2/1991 | Rylatt | |
| 4,994,233 A | 2/1991 | Freeman | |
| 4,996,018 A | 2/1991 | Bhatt et al. | |
| 5,009,837 A | 4/1991 | Nguyen et al. | |
| 5,017,333 A * | 5/1991 | Hayashi et al. | 376/382 |
| 5,024,806 A | 6/1991 | Cioffi et al. | |
| 5,030,413 A | 7/1991 | Knierriem et al. | |
| 5,043,134 A | 8/1991 | Widener et al. | |
| 5,068,083 A | 11/1991 | John, Jr. et al. | |
| 5,158,740 A | 10/1992 | Boatwright | |
| 5,207,980 A | 5/1993 | Gilmore et al. | |
| 5,230,195 A * | 7/1993 | Sease | E04B 2/18 |
| | | | 52/309.9 |
| 5,265,137 A | 11/1993 | Busch | |
| 5,268,948 A | 12/1993 | Church et al. | |
| 5,282,231 A | 1/1994 | Adams et al. | |
| 5,282,233 A | 1/1994 | Bryan | |
| 5,299,246 A | 3/1994 | Bryan | |
| 5,319,692 A * | 6/1994 | Hopkins et al. | 376/458 |
| 5,367,549 A | 11/1994 | Hatfield | |
| 5,436,945 A | 7/1995 | Weisel et al. | |
| 5,513,234 A | 4/1996 | Rottenberg | |
| 5,640,434 A | 6/1997 | Rottenberg | |
| 5,658,098 A * | 8/1997 | Woolbright | E02D 29/025 |
| | | | 405/284 |
| 5,934,037 A * | 8/1999 | Bundra | E04B 2/08 |
| | | | 52/126.4 |
| 6,055,288 A | 4/2000 | Schwirian | |
| 6,088,420 A | 7/2000 | Yokoyama et al. | |
| 6,497,274 B2 | 12/2002 | Cheadle | |
| 6,810,099 B2 | 10/2004 | Nakamaru et al. | |
| 6,895,067 B2 | 5/2005 | Borum et al. | |
| 6,918,470 B2 | 7/2005 | Guaraldo | |
| 7,280,946 B2 | 10/2007 | Russell, II et al. | |
| 7,424,412 B2 | 9/2008 | Kropaczek et al. | |
| 7,428,479 B2 | 9/2008 | Boer et al. | |
| 7,453,972 B2 | 11/2008 | Hellandbrand, Jr. et al. | |
| 7,526,058 B2 | 4/2009 | Fawcett et al. | |
| 7,548,602 B2 | 6/2009 | Smith, III et al. | |
| 7,574,337 B2 | 8/2009 | Kropaczek et al. | |
| 8,295,425 B2 | 10/2012 | Sakai et al. | |
| 8,462,910 B2 | 6/2013 | Inatomi et al. | |
| 8,472,581 B2 | 6/2013 | Young | |
| 2003/0029119 A1 * | 2/2003 | Coleman | E04B 2/08 |
| | | | 52/604 |
| 2003/0123600 A1 | 7/2003 | Hesketh et al. | |
| 2003/0169839 A1 | 9/2003 | Matteson | |
| 2005/0069080 A1 | 3/2005 | Goldenfield et al. | |
| 2006/0000179 A1 * | 1/2006 | Albert | E04B 2/16 |
| | | | 52/606 |
| 2006/0153327 A1 | 7/2006 | Jiang | |
| 2006/0222140 A1 | 10/2006 | Aleshin et al. | |
| 2006/0251205 A1 | 11/2006 | Balog | |
| 2007/0133732 A1 | 6/2007 | Nakayama et al. | |
| 2007/0206717 A1 | 9/2007 | Conner et al. | |
| 2008/0084957 A1 | 4/2008 | Aleshin et al. | |
| 2009/0032178 A1 | 2/2009 | Feinroth | |
| 2009/0225930 A1 | 9/2009 | Singleton | |
| 2010/0034336 A1 | 2/2010 | Takeda et al. | |
| 2010/0316181 A1 | 12/2010 | Thome et al. | |
| 2011/0096890 A1 * | 4/2011 | Balog | G21C 11/06 |
| | | | 376/458 |

FOREIGN PATENT DOCUMENTS

| | | |
|---|---|---|
| CN | 1041570 | 1/1999 |
| GB | 923149 | 4/1963 |
| JP | 1996-045474 A | 1/1996 |
| JP | 2003-114292 A | 4/2003 |
| WO | 1995/015565 | 6/1995 |
| WO | 2009/102374 | 8/2009 |

OTHER PUBLICATIONS

Office Action dated Apr. 1, 2016 for Chinese Application No. 201310125684.3.

* cited by examiner

SELF-SUPPORTING RADIAL NEUTRON REFLECTOR

This application claims the benefit of U.S. Provisional Application No. 61/623,332, filed Apr. 12, 2012. U.S. Provisional Application No. 61/623,332, filed Apr. 12, 2012 is hereby incorporated by reference in its entirety into the specification of this application.

BACKGROUND

The following relates to the nuclear power reactor arts, neutron reflector arts, and related arts.

In a nuclear reactor, fissile material is arranged in the reactor such that the neutron flux density resulting from fission reactions is sufficient to maintain a sustained fission process. In a commercial reactor, fissile material is typically provided in the form of fuel rods mounted in modular, elongated fuel assemblies which are generally square or hexagonal in cross section. A plurality of such fuel assemblies are arranged together to form a reactor core which is contained inside a cylindrical stainless steel core basket. This entire assembly, in turn, is mounted inside a pressure vessel. In a typical configuration, reactor coolant flows downward in an annular space between the core basket and the pressure vessel, reverses direction in a lower plenum of the vessel, flows upward through openings in a lower end plate at the bottom of the reactor core, and upward through the fuel assemblies where it is heated by the reactor core. The heat extracted by the reactor coolant from the core is utilized to generate electricity thereby lowering the temperature of the reactor coolant which is recirculated through the reactor in a closed loop. In boiling water reactor (BWR) designs, the primary coolant boils inside the pressure vessel and the resulting primary coolant steam is piped through a recirculating loop to drive a turbine. In pressurized water reactor (PWR) designs the primary coolant remains in a subcooled liquid state and heats secondary coolant in an external steam generator, and the secondary coolant drives a turbine. In a variant PWR design, the steam generator is located inside the pressure vessel (i.e., an integral PWR) and a secondary coolant circuit flows into the pressure vessel to feed the steam generator.

In the fission process, free neutrons are generated. In a thermal nuclear reactor, these neutrons are slowed, i.e. thermalized, by ambient water which is advantageous as thermalized neutrons are more likely to stimulate additional fission events as compared with faster neutrons. However, neutrons originating near the outer boundary of the reactor core may travel outside the reactor core and be lost. To improve overall efficiency and to increase burn rate for the outer fuel assemblies, it is known to include a core former, or radial reflector, between the reactor core and the core basket. The objective is to reflect neutrons traveling out of the core back toward the core to enhance burn of the fuel assemblies.

The welds, bolts, or other fasteners of the radial reflector experience high radiation flux, and can be prone to damage or failure due to the harsh operating environment with the reactor. Repair of any such damage is difficult or impossible due to the extremely radioactive environment. Moreover, the radial reflector can impede natural circulation around the reactor core, which may be problematic for any emergency core cooling system (ECCS) that relies upon natural circulation. In some instances radial reflectors are known to cause jetting of coolant laterally onto the fuel assemblies. Jetting is generally undesirable as excessive wear may result over time.

BRIEF SUMMARY

According to one aspect, an apparatus comprises a nuclear reactor core comprising fissile material and a core former surrounding the nuclear reactor core. The core former comprises one or more single-piece annular rings wherein each single-piece annular ring comprises neutron-reflecting material. In some embodiments the core former comprises a stack of two or more single-piece annular rings wherein each single-piece annular ring comprises neutron-reflecting material. In some embodiments the stack of single-piece annular rings is self-supporting. In some embodiments the stack of single-piece annular rings does not include welds or fasteners securing adjacent single-piece annular rings together.

According to another aspect, an apparatus comprises a nuclear reactor core comprising fissile material, a core former surrounding the nuclear reactor core and including one or more single-piece annular rings wherein each single-piece annular ring comprises neutron-reflecting material, and a core basket containing the nuclear reactor core and the core former. In some embodiments an annular gap is defined between the core former and the core basket. In some embodiments an annular gap is defined between the core former and the core basket and the core former comprises a self-supporting stack of single-piece annular rings wherein each single-piece annular ring comprises neutron-reflecting material. In some embodiments the outer surface of the core former includes axially extending channels. In some embodiments the core former does not include welds and does not include fasteners.

According to another aspect, a method comprises: constructing a core former by stacking a plurality of single piece annular rings wherein each single piece annular ring comprises neutron-reflecting material; and loading a nuclear reactor core inside the core former by disposing fuel assemblies comprising fissile material inside the core former. In some embodiments the method further includes, after the constructing and loading, operating a nuclear reactor comprising primary coolant disposed in a pressure vessel that also contains the constructed core former and loaded nuclear reactor core in order to heat the primary coolant. In some embodiments the method further comprises forging each single-piece annular ring. In some embodiments the method further comprises casting each single-piece annular ring. In some embodiments the method further comprises rolling and welding one or more plates to form each single-piece annular ring

BRIEF DESCRIPTION OF THE DRAWINGS

The invention may take form in various components and arrangements of components, and in various process operations and arrangements of process operations. The drawings are only for purposes of illustrating preferred embodiments and are not to be construed as limiting the invention.

DETAILED DESCRIPTION

Figure 1:
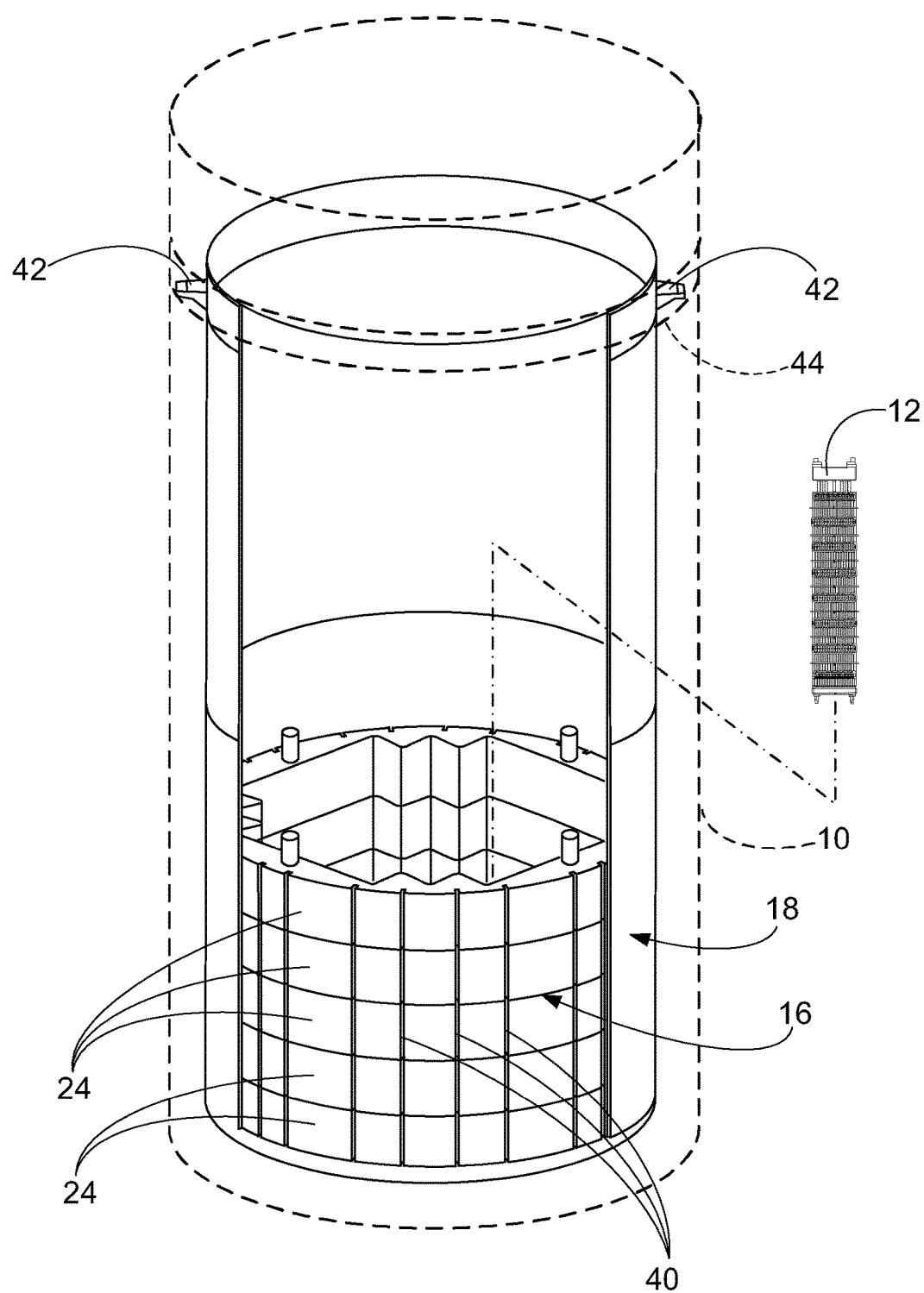
FIG. 1 diagrammatically shows a side view of the lower portion of a nuclear reactor including a core former, a containing core basket (shown in partial cutaway), a single illustrative fuel assembly shown being loaded, and a lower portion of the reactor pressure vessel shown in phantom.
Figure 2:
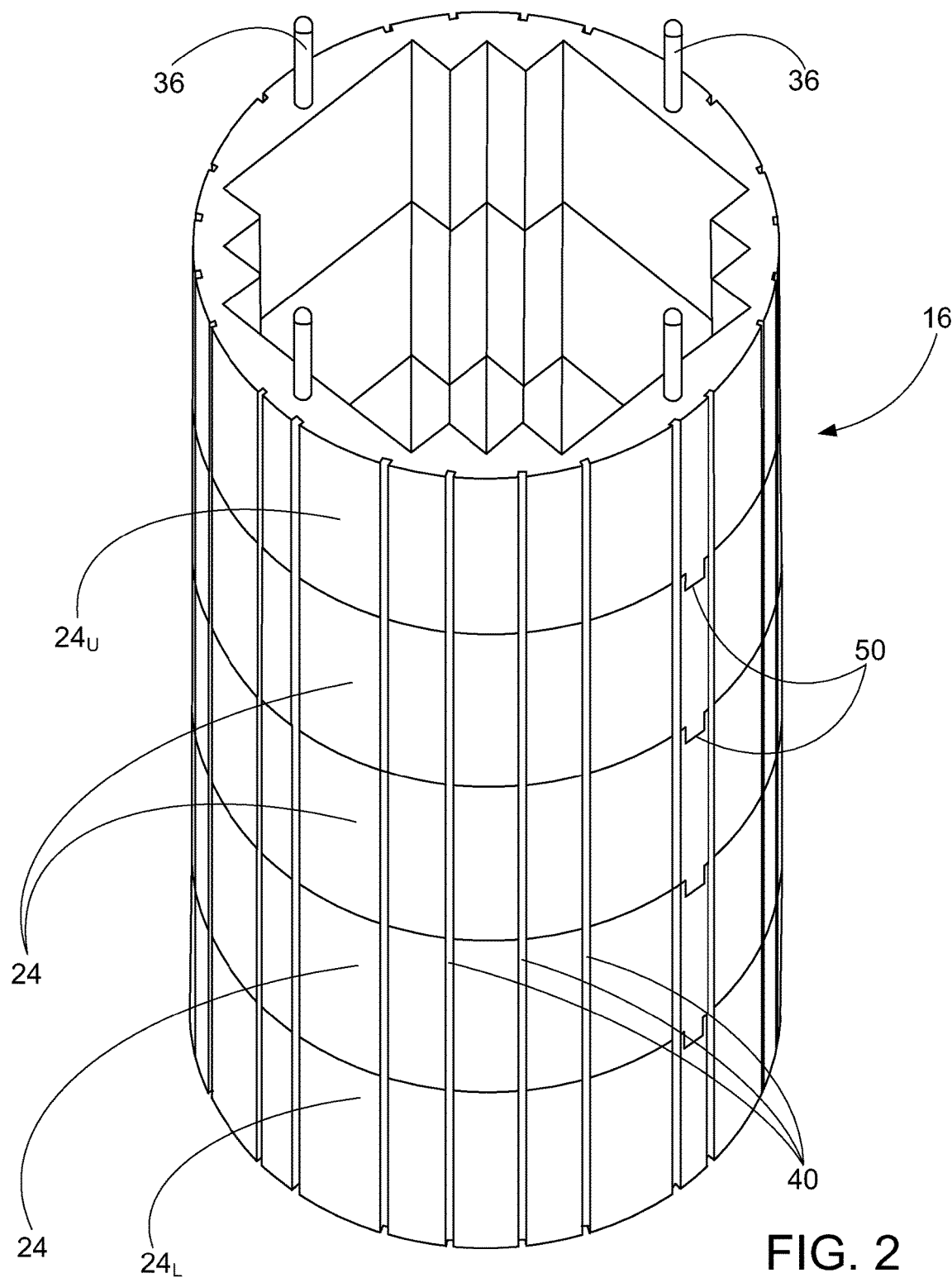
FIG. 2 is a perspective view of the core former of FIG. 1.
Figure 3:
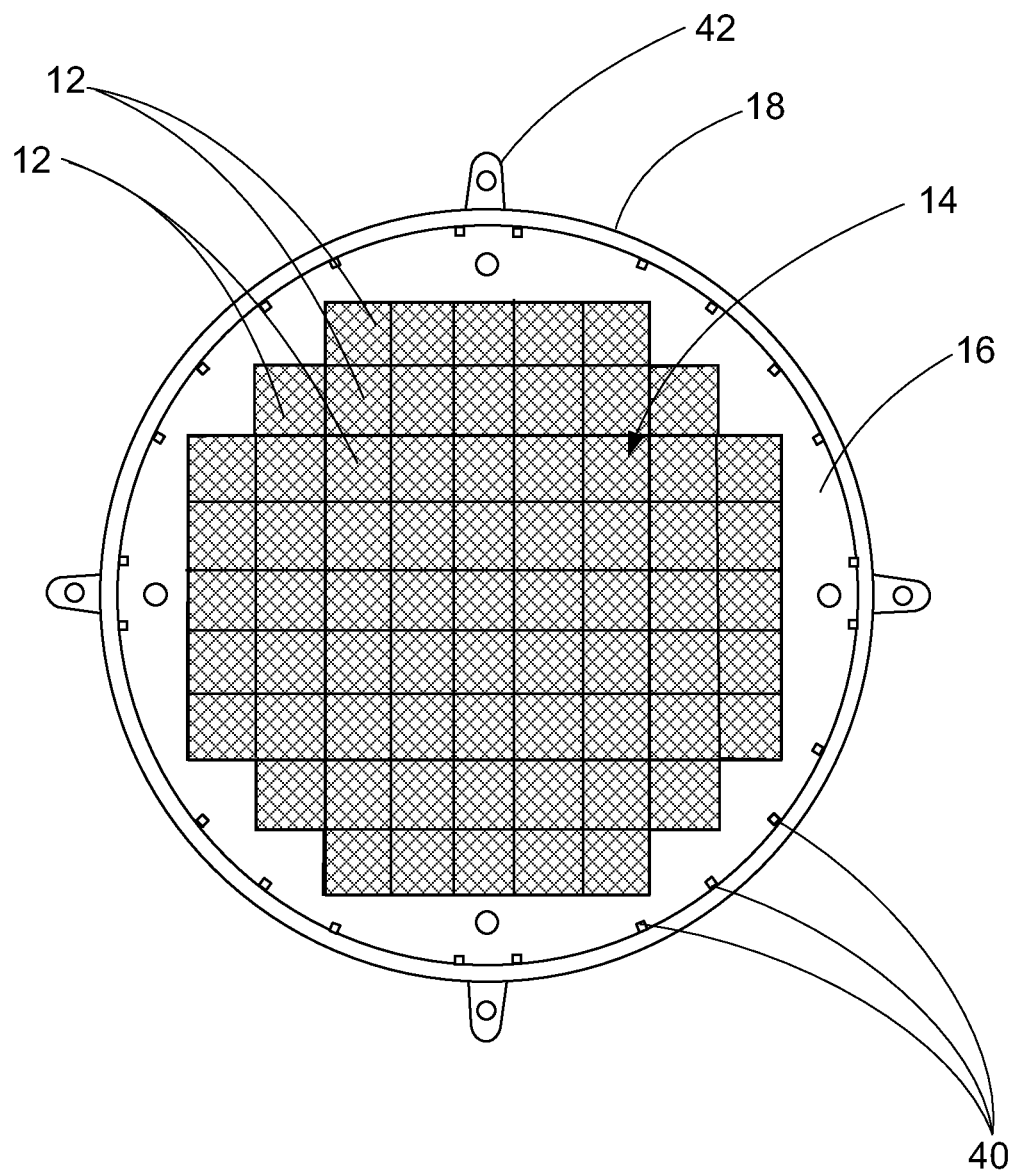
FIG. 3 is an overhead view of the core former of FIGS. 1 and 2 with all fuel assemblies loaded.

With reference to FIGS. 1-3, a core former as disclosed herein is described in the context of an illustrative nuclear reactor of the pressurized water reactor (PWR) type. The nuclear reactor includes a pressure vessel 10, only a lower portion of which is shown diagrammatically in phantom in FIG. 1. The lower portion of the pressure vessel contains a reactor core constructed as an array of fuel assemblies. For illustrative purposes, FIG. 1 shows a single fuel assembly 12 being loaded into the reactor. (The loading is done using a crane or other lifting apparatus, not shown). The fuel assembly 12 is shown diagrammatically, and typically includes a structural skeleton of spacer grids and upper and lower end fittings or nozzles supporting the fuel rods with guide tubes interspersed amongst the fuel rods to provide conduits for control rods, instrumentation, or the like (details not illustrated). FIG. 3 shows an overhead or top view including the complete nuclear reactor core 14 constructed as an array of fuel assemblies 12. The illustrative reactor core of FIG. 3 includes 69 fuel assemblies, but more or fewer fuel assemblies can be included depending upon the size of the core and the sizes of the constituent fuel assemblies. The illustrative fuel assemblies 12 are all of equal size, and the layout of the fuel assemblies in the reactor core can be varied.

The reactor core 14 is contained in a core former 16 which in turn is contained in a core basket 18. The reactor core 14 can have substantially any configuration compatible with a light water reactor. In the illustrative configuration shown in FIG. 3, the reactor core includes 69 PWR type fuel assemblies each having a 17×17 array of fuel rods supported by a bottom grid structure that is part of a core former 16. The upper portion of the nuclear reactor is not shown, but typically includes a hollow cylindrical central riser defining an inner cylindrical plenum conducting primary coolant exiting from the top of the reactor core 14 upward. This is sometimes called the "hot leg" of the primary coolant circuit. A downcomer annulus is defined between the central riser and the pressure vessel 10, and provides the downward flowing "cold leg" of the primary coolant circuit which returns primary coolant to the bottom of the nuclear core 14. The reactor optionally includes other components such as internal steam generators, a reactivity control sub-system including control rods coupled with external or internal control rod drive mechanisms (CDRM), an optional internal pressurizer, and so forth. Other vessel configurations and reactor types are also contemplated, including PWR designs with external steam generators, integral PWR designs with steam generators disposed inside the pressure vessel, various BWR designs, and so forth.

The core former 16 provides lateral support of the fuel assemblies and is constructed as a stack of single-piece annular rings 24. Each annular ring is a single-piece component, for example a single-piece forged or cast stainless steel ring. A single-piece may also be formed by rolling and welding one or more plates. Each annular ring is suitably a monolithic element without joints or seams. The stack of annular rings 24 is optionally a self-supporting stack, with the upper end of each ring supporting the lower end of the next-higher ring in the stack. On the other hand, if the reactor core is of sufficiently low profile it is contemplated to employ as few as a single annular ring in constructing the core former. In FIG. 1, the illustrative core former 16 is shown concentrically arranged with core basket 18 (e.g., a lower shroud), a portion of the core basket 18 being removed in FIG. 1 to expose the core former 16 for purposes of illustration.

Figure 4:
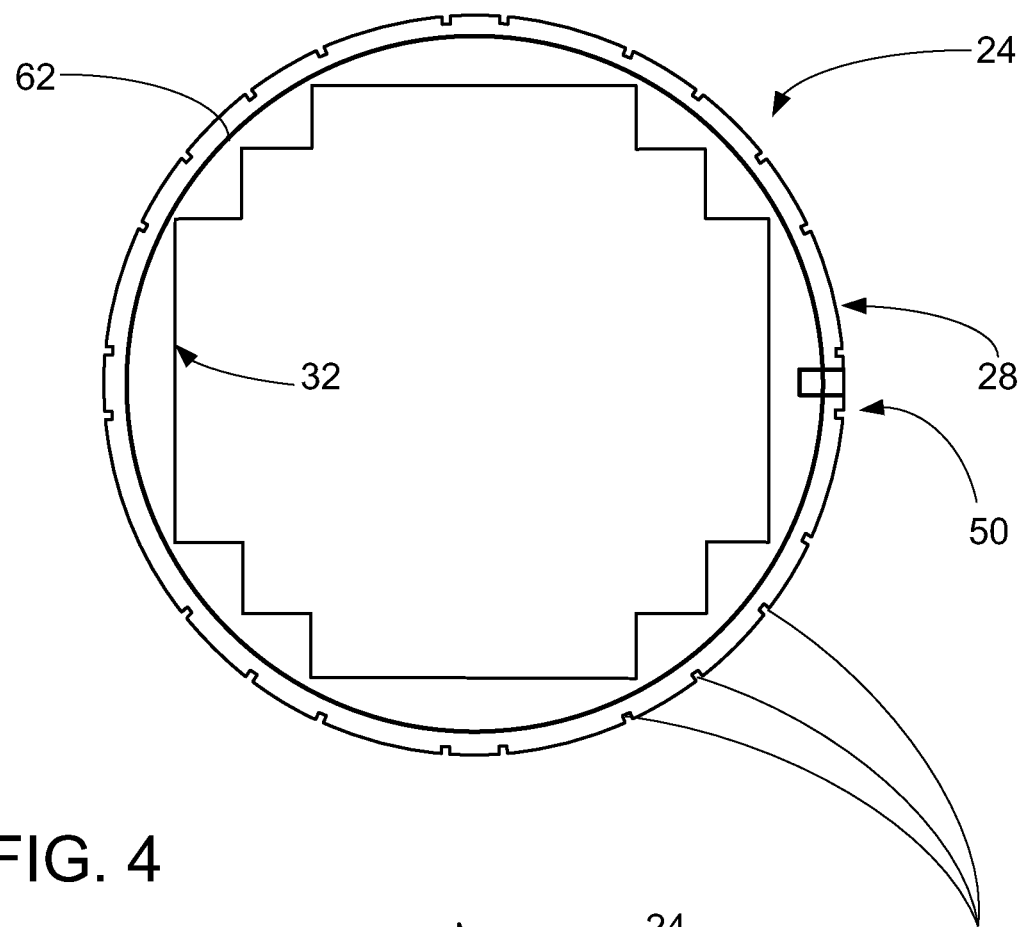
FIG. 4 is a plan view of one core former ring of the core former of FIGS. 1-3.

FIG. 4 illustrates a top view of a single core former ring 24. The core former ring 24 is an annular element having a cylindrical outer surface 28 and an inner 32 shaped to conform with the outer periphery of the reactor core 14 (see also FIG. 3). More generally, the outer surface 28 should conform with the inner surface of the core basket, which is cylindrical in the case of illustrative core basket 18.

With particular reference to FIGS. 1 and 2, in the axial direction, that is, the direction transverse to the plane of the annular ring 24, the number of rings 24 in the stack is sufficient for the core former 16 to be at least coextensive with the axial extent of the reactor core 14. Said another way, the "height" of the core former 16 should be equal to or greater than the "height" of the reactor core 14 that is placed within the core former 16. Advantageously, the core former 16 does not include any welds, bolts, or other fasteners. Rather, the stack of annular rings 24 is self-supporting.

For manufacturing convenience, it is advantageous for the rings 24 of the stack to be interchangeable. However, in some embodiments the uppermost ring and/or the lowermost ring may be different. By way of illustrative example, the core former 16 includes five annular rings 24, of which the three middle single-piece annular rings 24 are interchangeable, the lowermost ring 24" omits any bottom-surface features intended to mate with a "further-below" ring (since it is not aligning with a ring located below it) and the uppermost ring $24_U$ similarly omits any upper-surface features intended to mate with a "further-above" ring. Additionally, the uppermost ring $24_U$ includes pins 36 on the upper surface for lateral and rotational alignments of components, such as upper internals, located above the uppermost ring $24_U$. Additional pins or other core former retention features may be included to keep the rings from moving vertically. In some embodiments the weight of the annular rings 24, either alone or in combination with the weight of components located above the uppermost ring $24_U$, may be sufficient to prevent vertical movement, in which case no mounting or retention features are needed.

As noted, the radially inner surface 32 of each ring 24 conforms to the shape of the core (e.g., plurality of fuel assemblies 12) and the radially outer surface 28 is cylindrical or otherwise shaped to conform with the inner surface of the core basket 18. In some embodiments there is a relatively small gap (e.g., annular, flow passage) defined between the outer surface 28 of the core former 16 and the inner diameter or surface of the core basket 18 for the circulation of water. This gap serves as a thermal sleeve, and also allows bypass flow outside of the core which can be useful in some emergency core cooling system designs. In one embodiment, gamma heating increases the temperature of the core former rings 24 and bypass flow provides cooling. The thermal sleeve functionality helps accommodate the thermal difference from the hot leg to the cold leg of the nuclear reactor cooling system, and reduces stresses within the core former 16 that can be generated because of such thermal gradient. The flow bypass functionality is useful in the event of a loss of primary coolant flow, as the thermal sleeve also acts as a bypass flow channel, allowing water to travel in a natural circulation loop vertically downwards through the thermal sleeve, exit the core former 16 at the bottom, and turn and enter the core where it exits the top of the core and again turns and enters the thermal sleeve to repeat the loop. During normal operation, the bulk of the primary coolant flow enters the bottom of the core former 16 and flows upward through the reactor core 14, and only a small portion of the total flow travels upward through the thermal sleeve.

Optionally, more bypass flow can be provided (or the amount of bypass flow can be designed) by increasing the size of the thermal sleeve or by providing bypass flow slots or channels 40 in the outer surfaces 28 of the rings 24 of the core former 16. In the stack of rings, these channels 40 extend the entire axial length of the core former 16 to allow more bypass flow in addition to the thermal sleeve. The size, shape, and location of these slots can be chosen to provide a desired level of bypass flow. Instead of or in addition to the bypass flow slots 40 on the outside surface 28 of the core former 16, one or more holes could be drilled axially through the stack of core former rings.

The core former 16 and the reactor core 14 are disposed in the core basket 18. In the illustrative embodiment, the core basket 18 is suspended from a mid-flange 44 (indicated diagrammatically in FIG. 1) of the pressure vessel 10 by mounting brackets 42. Other arrangements are also contemplated, including support of the core basket from below, e.g. by feet or pedestals resting on a lower surface of the pressure vessel.

The core former 16 is intended to act as a neutron reflector. (Said another way, the core former 16 can alternatively be considered to be a neutron reflector 16). Toward this end, the annular rings 24 of the core former 16 are made of stainless steel or another suitable corrosion resistance neutron reflective material in order to provide neutron reflection so as to more efficiently burn the fuel in the periphery fuel assemblies. The lack of welds, bolts or other threaded fasteners, or the like in some embodiments is advantageous as welds or fasteners can suffer failures due to irradiation embrittlement and differential thermal expansion created from the radiation and heat output by the reactor core 14. In addition, the core former 16 has few components, e.g. five rings 24 in the illustrative core former 16 and optional additional components such as the illustrative upper constraint pins 36.

While five annular rings 24 are employed in the illustrative core former 16, other numbers of rings (down to as few as a single ring) can be arranged or stacked axially to produce a core former of a desired height. The quantity, size, and geometry of each of the rings can vary to create a wide range of core formers.

Adjacent rings can include mating features on for interlocking and/or restricting radial and/or axial movement between the rings. For example, the as seen in FIGS. 2 and 4, adjacent rings can be keyed together by a key/keyway interlocking configuration 50 to prevent relative rotation between adjacent rings. In some embodiments, the stack of single-piece annular rings 24 is self-supporting. However, it is alternatively contemplated to include lateral support, for example via the surrounding core basket, in order to prevent the stack from leaning or to provide load transfer from the core basket into the core former or from the core former to the core basket.

Figure 5:
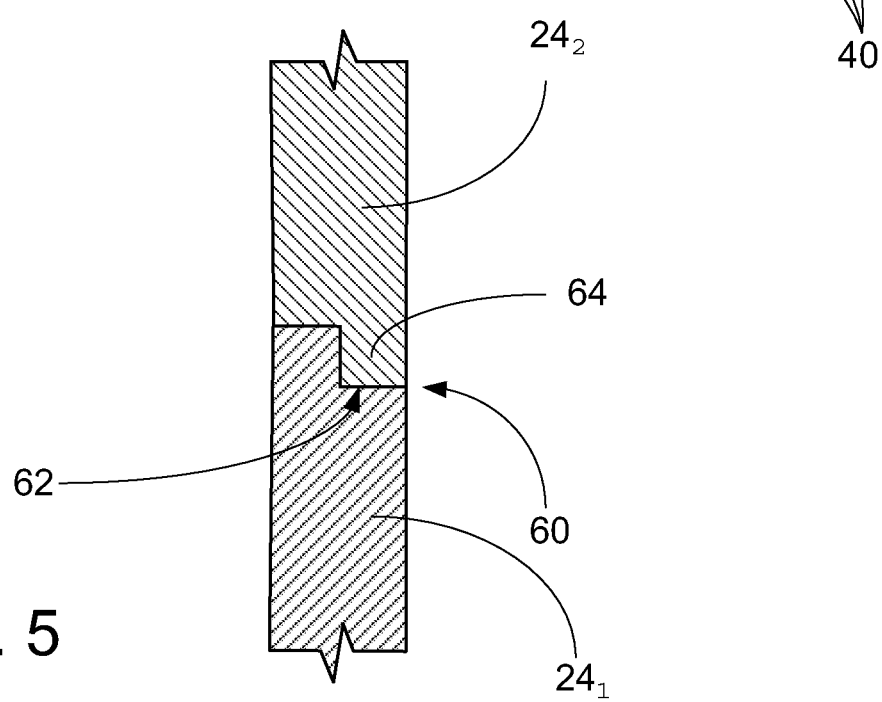
FIG. 5 is a diagrammatic side cross-sectional view taken through two rings of the core former showing an optional shiplap joint.

With reference to FIG. 4 and with further reference to FIG. 5, mating surfaces of adjacent rings 24 of the stack can include an annular joint 60 that provides a tortuous path for (lateral) fluid flow into or out of the core former 16 via the joints between the rings 24. FIG. 5 shows a side sectional view of a portion of a ring $24_1$ and a ring $24_2$ stacked on top of the ring $24_1$. As seen in FIG. 5, the top surface of the lower ring $24_1$ includes a circumferential groove or recess 62 that mates with a circumferential protrusion 64 on the bottom surface of the upper ring $24_2$. FIG. 5 shows the upper surface of one of the rings 24 including the circumferential groove or recess 62. (The circumferential protrusion 64 is on the bottom surface of the ring 24 and hence is not visible in FIG. 4). This configuration forms the illustrative annular joint 60 in the form of a shiplap joint that provides enhances alignment of the rings in the stack while also reducing leakage through the interface between the rings. The joint configuration further inhibits coolant from flowing between adjacent rings and subsequently spraying or otherwise jetting into the fuel assemblies. The lowermost ring $24_L$ of the stack omits the circumferential protrusion 64 (since there is no further-below ring with which to mate), and similarly the uppermost ring $24_U$ omits the circumferential groove or recess 62. Other suitable annular joints providing the desired tortuous flow path through the joint include mating grooves/protrusions.

The illustrative core former 16 surrounds the entire height of the reactor core 14, but is still contained within the core basket 18. The core former 16 in one embodiment is made of stainless steel to reflect neutrons that leave the core region back into the core to continue the nuclear reaction. The rings comprising the core former 16 can be forged or cast, for example. As mentioned, one preferred material is stainless steel. The rings can have a wide range of radial thicknesses. The thickness should be chosen to provide adequate neutron reflection, and should also be sufficient to ensure structural integrity of the stack of annular rings 24. A relatively thicker core former may be used to enhance burn-up of the periphery fuel assemblies, for example in the context of a small modular reactor (SMR) having a relatively small core, and/or in the context of a reactor design intended for operation without performing occasional fuel shuffling. More generally, the disclosed core former designs are suitable for use in nuclear reactors of any size, and are suitable for use in conjunction with fuel shuffling or without fuel shuffling. The term "fuel shuffling" refers to the process of occasionally shutting down the reactor and moving fuel assemblies to different locations within the reactor core so that the fuel in each fuel assembly is more thoroughly consumed than would be the case if each fuel assembly remained in a single location within the reactor core for the entire useful life of the fuel.

The exemplary embodiments have been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. An apparatus comprising:
   a nuclear reactor core comprising fissile material;
   a core basket; and
   a core former surrounding the nuclear reactor core, the core former comprising a stack of two or more single-piece annular rings wherein each single-piece annular ring comprises neutron-reflecting material,
   wherein adjacent single-piece annular rings of the stack of single-piece annular rings include a key feature disposed on a first one of the adjacent single-piece annular rings and a keyway feature disposed on a second one of the adjacent single-piece annular rings, wherein the key feature is received in the keyway feature to prevent relative rotation of the first one and the second one of the adjacent single-piece annular rings, and wherein the stack of single-piece annular rings does not include welds or fasteners that axially restrain adjacent single-piece annular rings together or that secure the rings to the core basket.

2. The apparatus of claim 1, wherein the single-piece annular rings are forged or cast annular rings.

3. The apparatus of claim 2, wherein the single-piece annular rings are stainless steel annular rings.

4. The apparatus of claim 1, wherein the single-piece annular rings are stainless steel annular rings.

5. The apparatus of claim 1, wherein adjacent single-piece annular rings of the stack have mating surfaces shaped to define an annular joint between the adjacent single-piece annular rings that provides a tortuous path for fluid flow into or out of the core former via the joints.

6. The apparatus of claim 1, wherein the core basket contains the nuclear reactor core and the core former.

7. The apparatus of claim 6, wherein an annular gap is defined between the core former and the core basket.

8. The apparatus of claim 6, wherein the outer surface of the core former includes axially extending channels.

9. The apparatus as set forth in claim 6, further comprising:
a pressure vessel containing the nuclear reactor core, the core former, and the core basket.

10. The apparatus as set forth in claim 9, wherein the core basket is suspended from a mid-flange of the pressure vessel.

11. The apparatus of claim 1, wherein each single-piece annular ring is a monolithic element without joints or seams.

12. The apparatus of claim 1, wherein the core former does not include welds and does not include fasteners.

13. An apparatus comprising:
a core basket; and
a core former sized for a nuclear reactor core, the core former comprising a stack of two or more single-piece annular rings wherein each single-piece annular ring comprises neutron-reflecting material and has an inner surface conforming with a periphery of the nuclear reactor core,
wherein a first one of the single-piece annular rings includes a circumferential recess in one of its top surface and its bottom surface, and a second one of the single-piece annular rings includes a circumferential protrusion in one of its top surface and its bottom surface, and the circumferential protrusion is received within the circumferential recess,
wherein the stack of single-piece annular rings does not include welds or fasteners axially restraining adjacent single-piece annular rings together or that secure the rings to the core basket, and
wherein the first one of the single-piece annular rings includes a key feature disposed on one of its top surface and its bottom surface and the second one of the adjacent single-piece annular rings includes a keyway feature disposed on one of its top surface and its bottom surface, and the key feature is received in the keyway feature to prevent relative rotation of the first one and the second one of the adjacent single-piece annular rings.

14. The apparatus of claim 13, wherein the core basket contains the nuclear reactor core and the core former.

15. The apparatus of claim 13, further comprising:
a pressure vessel containing the nuclear reactor core, the core former, and the core basket.

16. The apparatus of claim 13, wherein the outer surface of the core former includes axially extending channels.

* * * * *